Feb. 10, 1953 E. C. HANDWERK 2,627,668
METHOD OF CONTACTING SOLIDS AND GASES
Filed May 17, 1949 2 SHEETS—SHEET 1
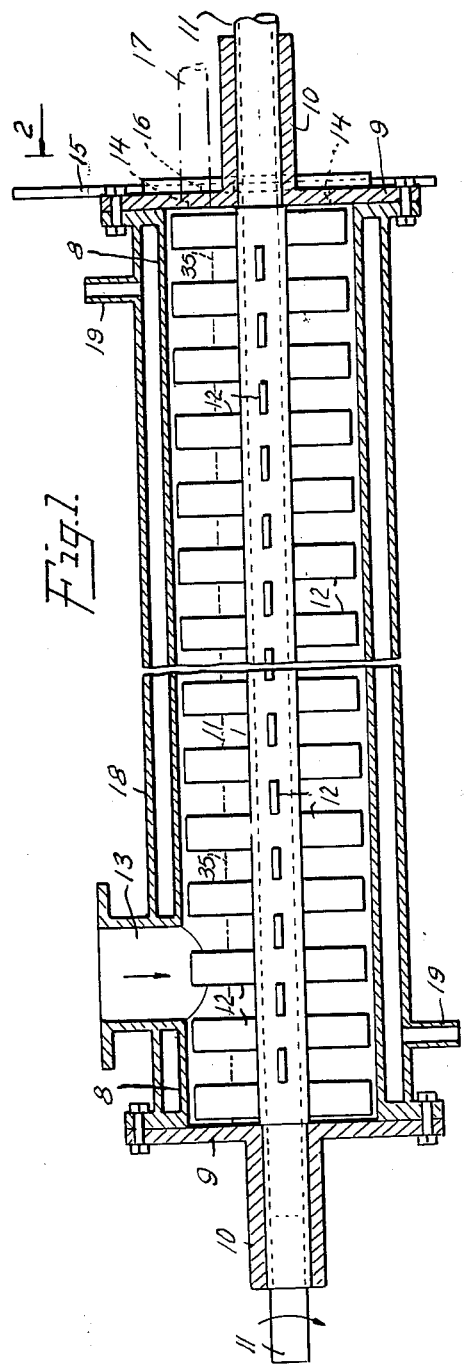
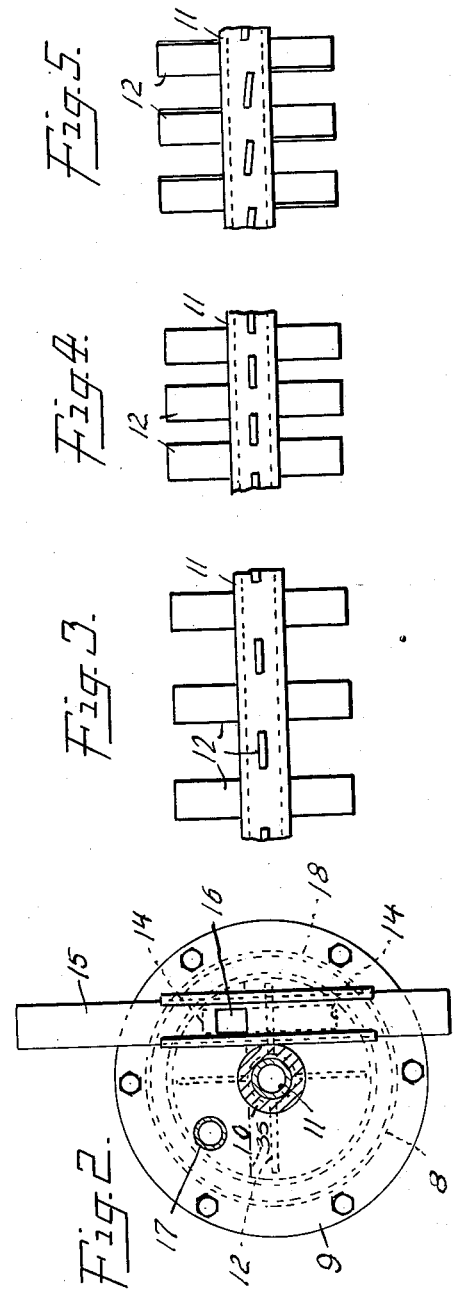
INVENTOR.
ERWIN C. HANDWERK
BY
ATTORNEYS

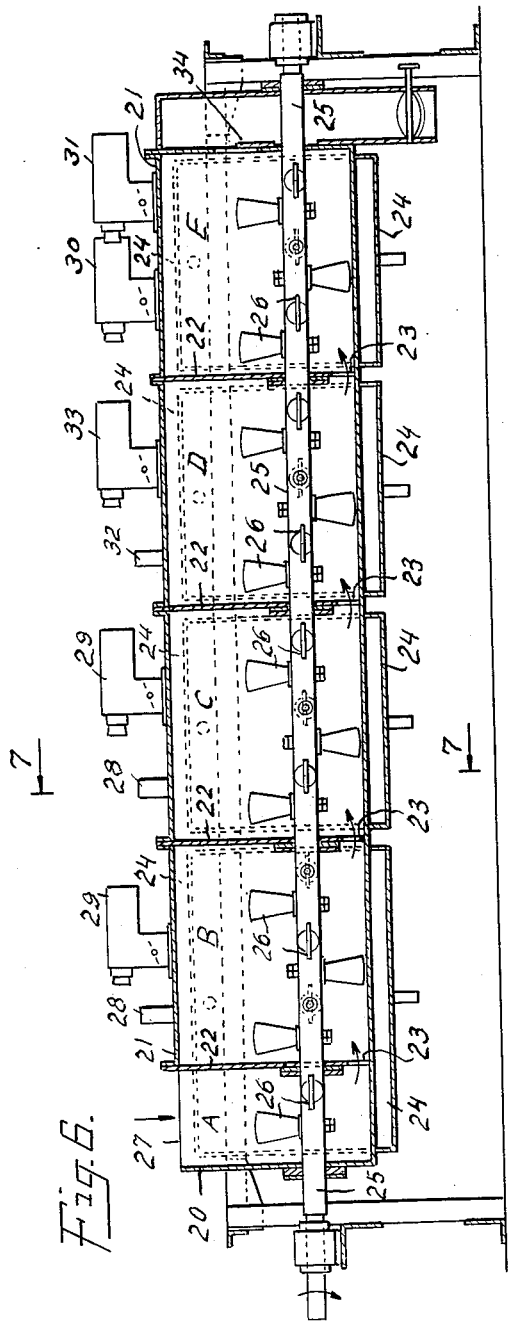
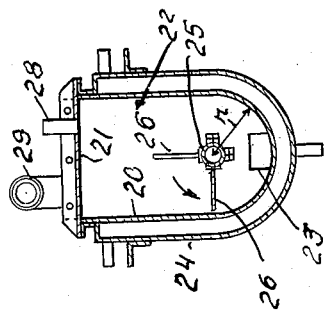

Patented Feb. 10, 1953

2,627,668

UNITED STATES PATENT OFFICE 2,627,668

METHOD OF CONTACTING SOLIDS AND GASES

Erwin C. Handwerk, Lehighton, Pa., assignor to The New Jersey Zinc Company, New York, N. Y., a corporation of New Jersey Application May 17, 1949, Serial No. 93,697

3 Claims. (Cl. 34—33)

This invention relates to the contacting of a solid with a gas and, more particularly, comprises a novel method of effecting such contact while maintaining the solid in a fluidized condition.

In many processes involving the contacting of discrete particles of a solid with a gas, the problem of effecting intimate contact therebetween has been answered by utilizing the flow of the gas to fluidize a mass of the particles in the form of a fluid bed. The maintenance of a fluid bed of sufficient size to afford an appreciable treating capacity has been complicated by the tendency of the bed to channel and of the gas to accumulate in the form of a bubble, both of which phenomena permit passage of the gas through the solid without effective contact therewith. Another difficulty has been encountered in fluid bed operation wherein short circuiting of the solid from the top to the bottom of the bed has characterized attempts to make the fluid bed operation a continuous one wherein the solid is caused to flow through the fluid bed. Moreover, such fluid bed operation is impaired by any agglomeration of the discrete particles due to incipient fusion or the like.

I have now devised a method of effecting contact between discrete particles of a solid and a gas wherein intimate contact therebetween is insured by maintaining the solid in a mechanically fluidized condition without the limitations and disadvantages of prior art procedures. The method of my invention makes possible contact between the gas and the fluidized solid under conditions which permit continuous operation in the sense that the solid flows through the fluidized mass thereof without short circuiting of the solid and gas while maintaining any desired charging schedule of the solid or the gas to the treating operation. The fluidization of the solid particles by mechanical means also renders the maintenance of fluid bed conditions less susceptible to difficulty when some incipient fusion of the particles leads to partial agglomeration thereof.

The method of effecting contact between a solid and a gas in accordance with the present invention comprises introducing the solid in the form of discrete particles into one end of a substantially horizontally disposed elongated vessel, introducing the gas into the vessel, maintaining within the vessel a mass of said particles sufficient in amount to produce a fluidized mass thereof when mechanically agitated in the presence of said gas, maintaining the particles of the solid within the vessel in the form of a fluidized mass by mechanically agitating said particles in the presence of the gas, and discharging the particles of solid from the vessel adjacent the opposite end thereof. In accordance with this method, the passage of the particles of solid through the vessel is effected by fluid flow of the fluidized mass of said particles.

These and other novel features of the method of my invention will be further understood by reference to the following description taken in conjunction with the drawings in which Fig. 1 is a sectional side elevation of apparatus suitable for carrying out the method of the invention;

Fig. 2 is an end view of said apparatus taken along line 2—2 in Fig. 1;

Figs. 3, 4 and 5 show variations in the paddle structure within the apparatus whereby the particles of the solid may be maintained in a fluidized condition;

Fig. 6 is a sectional side elevation of another form of apparatus in which the method of my invention may be practiced with advantage; and Fig. 7 is a sectional elevation taken along line 7—7 in Fig. 6.

Apparatus suitable for practicing the method of my invention comprises, as shown in Figs. 1 and 6, a horizontally disposed elongated vessel 8 which may be substantially cylindrical in shape or may be trough-like in cross section. The essential requirement with regard to the shape of the vessel 8 is that it be adapted to permit sufficient mechanical agitation of the particles of solid therewithin as to maintain a mass of the particles in a fluidized condition. The ends of the vessel 8 are provided with closure plates 9 which may be provided with bushings 10 adapted to serve as bearings for a rotatable shaft 11 axially mounted within the vessel 8. Paddle blades 12 are mounted on the shaft within the vessel in such manner as to permit sufficient mechanical agitation of the particles of solid within the vessel to maintain the particles in a fluidized condition. The vessel is provided adjacent the upper portion thereof with an inlet 13 for charging the particles of solid near one end of the vessel, and the vessel is provided at the opposite end thereof with an outlet 14 adapted to discharge the treated solids from the vessel. The outlet 14 is advantageously formed as a vertically disposed slot in the end closure plate 9, as shown more clearly in Fig. 2. An adjustable discharge opening for the outlet is provided by a sliding cover plate 15 having an opening 16 therein. By raising or lowering the cover plate 15, the discharge opening 16 may be raised or lowered to control the level of solids within the vessel. The vessel is further provided with a gas inlet line 17 adjacent the solids-discharge end of the vessel, the treating gas being withdrawn advantageously through the solids-charging inlet 13.

The method of the invention is practiced in the apparatus shown in Fig. 1 by rotating the shaft 11 at a relatively high speed. The particles of the solid are introduced through the inlet 13 into the interior of the vessel 8, and the treating gas is introduced through line 17 into the other end of the vessel. Rotation of the shaft 11 at high speed causes the paddle blades 12 to agitate the particles of solid within the vessel to such an extent that the mass of particles within the vessel is expanded in the atmosphere of the gas charged to the vessel. In this expanded condition, the mass of particles behaves like a fluid, that is, it exhibits the mobility, hydrostatic pressure and observable upper free boundary zone characteristic of a body of liquid (cf. the definition of a fluidized body of solid particles in "Chemical and Engineering News," vol. 27, March 7, 1949, page 686, and in "Industrial and Engineering Chemistry," vol. 41, June 19, 1949, pages 1249 and 1250). The fluidized mass flows from the solids-charging end of the vessel to the solids-discharging end where it is discharged through the adjustable opening 16 associated with the outlet slot 14. The rate of flow of the fluidized mass through the vessel 8 is controlled by the rate of charging of the solid through the inlet 13. An increase in this charging rate provides an increased hydrostatic head which, in turn, increases the rate of flow of fluidized solid through the vessel. The vertical position of the discharge opening 16 determines the depth of the fluid bed through which the solids pass, the upper body of the bed being indicated by the dotted line 35 in Figs. 1 and 2. Accordingly, the retention period of the solid in contact with the gas within the vessel 8 is controlled by a combination of control of the solids feeding rate and the height of the discharge opening 16.

The method of my invention, as pointed out hereinbefore, is characterized by the maintenance of the solids within the treating vessel in the form of a fluidized mass. If the solids were permitted to discharge from substantially the level of the lower portion of the vessel 8, the only solids retained in the vessel would be those forming a layer thereof on the inner surface of the vessel, the thickness of the layer being substantially equal to the clearance between the extremities of the paddles 12 and the inner surface of the treating vessel. In accordance with the method of my invention, the solids are discharged from the treating vessel in such manner as to maintain therein a mass of the solid particles sufficient in amount to produce a fluidized mass thereof when mechanically agitated in the presence of the treating gas. Thus, by providing a solids-discharge opening at a level substantially above the bottom of the treating vessel, a mass of the solid particles is maintained within the vessel which substantially exceeds the amount of solids which would simply form a layer of the solid particles on the inner surface of the vessel. This larger mass of solids is therefore mechanically agitated by the paddles 12, and in the presence of the treating gas the agitated solid particles form a fluidized mass. The resulting fluidized mass flows along the interior of the treating vessel at a rate determined by the solids-charging rate and by the depth of the fluid bed maintained within the vessel.

The size of the particles of solids which may be treated in accordance with the method of my invention may range from that of a powder up to particles having an average diameter of ½ inch, and even up to ¾ inch in the case of relatively low density materials such as coal and the like. Thus, the method is capable of effecting contact between a gas and such solids as zinc oxide, fine coal, zinc sulfide ore concentrate, crushed limestone, and crushed iron-titanium ore such as ilmenite having a maximum particle size of about ½ to ¾ inch diameter.

The gases which may be used in practicing the method of the invention may be relatively inert with respect to the solids or they may be reactive therewith. For example, the inert gas may comprise the combustion products of a heating gas, the combustion of which is used to heat the particles of solid such as crushed ilmenite ore, limestone, or the like. A reactive gas, for example, may comprise a mixture of air and steam provided for reaction with fine anthracite at an elevated temperature for the producer gas. The reactive gas may also be the air used in roasting zinc sulfide ore concentrates or may comprise the vapors of propionic acid which are to be brought in contact with zinc oxide for the purpose of improving the surface characteristics thereof. It will be understood, accordingly, that the term "gas" as used herein and in the claims includes not only inert and reactive gases but also similar vapors of either normally liquid or solid materials.

A temperature-controlling jacket 18 may be provided about the contacting vessel 8 whenever desirable. The uses of such a jacket are manifold. For example, in the high temperature calcination of limestone or in the preheating or roasting of ilmenite ore within the vessel, it may be advantageous to circulate cooling air through the jacket in order to prevent deterioration of the walls of the vessel. When a more moderate elevated temperature is maintained within the contacting vessel by the self-contained heat of either the solid or the gas, or when the desired moderate temperature is provided by exothermic heat of reaction, the vessel may be "insulated" to minimize heat loss therefrom by passing a heating medium such as steam through the jacket 18. On the other hand, either a heating or cooling medium may be passed through the jacket in order to supply heat to or remove heat from a reaction between the fluidized solid and gas within the vessel. The temperature controlling medium is supplied to and withdrawn from the jacket through suitable inlet and outlet lines 19.

The paddle structure is not critical but should be such as to provide the necessary degree of agitation of the solid within the vessel as to maintain the solid in a fluidized condition substantially filling the contacting vessel. Flat paddle blades are generally suitable for this purpose. The blades are advantageously mounted in pairs positioned diametrically opposite one another about the shaft 11. Although, as shown in Fig. 1, the paddles 12 effectively fill up the length of the shaft 11 within the contacting vessel, gaps may be left between the positions of adjacent pairs of paddles as shown in Fig. 3, or the positions of adjacent pairs of paddles may overlap as shown in Fig. 4. It has been found that, for most purposes, paddle blades having their flat faces disposed parallel to the axis of the shaft produce suitable results, although the blades may be turned or pitched somewhat, as shown in Fig. 5, in order either to accelerate the flow of solids through the vessel or to retard their flow therethrough. As further shown in Figs. 3 through 5, the shaft 11 may be of hollow construction so that the shaft can be cooled or heated by the passage of a suitable temperature controlling medium therethrough.

The speed of rotation of the shaft required to produce the desired fluidization of the particles of solid within the contacting vessel depends upon the cross-sectional size of the vessel, the number of paddles positioned circumferentially about the shaft 11, and the size and density of the solid particles to be fluidized. In general, the peripheral speed of the ends of the paddles 12, which terminate out of contact with the inner surface of the vessel 8, should be within the range of about 150 to 450 feet per minute. Accordingly, with an increase in the cross-sectional size of the treating vessel 8, the speed of rotation of the shaft 11 is decreased in order not to impart such peripheral speed to the solid particles adjacent the inner surface of the vessel as to cause excessive wear of this surface. As the size of the vessel is increased and the speed of rotation of the paddle-bearing shaft is decreased, it is generally desirable to increase the number of paddles positioned circumferentially about the shaft in order to provide the desired mechanical agitation of the particles of solid within the vessel. For example, it has been found that in a treating vessel having an internal diameter of 12 inches, the shaft should be rotated at a speed ranging from 50 to 150 R. P. M. Suitable fluidization of the solid is effected at these speeds by arranging the paddles about the shaft in diametrically positioned pairs with successive pairs of paddles positioned 90° out of phase. In a larger vessel having an internal diameter of 3 feet, the shaft should be rotated at a speed within the range of 20 to 60 R. P. M. with a set of 4 paddles disposed at each position on the shaft and with each set of paddles 45° out of phase.

The following examples will serve to show the wide range of solid-gas contacting operations to which the method of the present application is applicable. In the first example, the method was practiced in apparatus substantially the same as that shown in Fig. 1 of the drawings, the vessel being cylindrical in shape with an internal diameter of 12 inches and a length of 4 feet. The paddle-bearing shaft was rotated at about 135 R. P. M.

*Example I*

Ilmenite ore, crushed to a maximum particle size of about $\frac{1}{16}$ inch, was charged to the vessel at the rate of 9 tons per 24 hours. The gas introduced through the inlet 17 consisted of the flame and products of combustion from a gas burner mounted in the end closure plate of the vessel. The side walls of the vessel were kept cool by passing air through the jacket 18, and the hollow shaft 11 was cooled by circulating water therethrough. The flame temperature adjacent the firing end of the vessel was maintained at about 1200 to 1300° C., and the exit temperature of the gas through the ore inlet 15 approximated 350° C. The ore was preheated to a temperature of about 600 C., about 75% of the heat of the flame being abstracted by the ore in its passage through the treating vessel.

The apparatus shown in Figs. 6 and 7 is illustrative of a device useful in practicing the method of my invention wherein a plurality of zones of controlled conditions are maintained in the path of flow of fluidized solid. The apparatus shown in these figures is particularly suited for the treatment of zinc oxide with propionic acid. The treating vessel 20, which is about 12 feet long, is substantially trough-shaped in cross-section with a width of 36 inches. The top of the vessel is closed by a flat cover 21. The interior of the vessel is divided into five compartments by means of partitions 22 each provided adjacent its lower portion with a passageway 23. The compartments are provided adjacent the sides and bottom of the vessel 20 with steam jackets 24 whereby the desired elevated treating conditions may be maintained within the various compartments. A rotatable shaft 25 extends throughout the entire length of the vessel and is provided with a plurality of paddles 26. A single paddle is secured to the shaft at each position, adjacent paddles being successively positioned 90° out of phase with one another. Operation of the apparatus is described in the following example.

*Example II*

The apparatus shown in Figs. 6 and 7 was charged with zinc oxide admitted through a charge inlet 27. The zinc oxide was fluidized within this feeding compartment, identified in Fig. 6 as compartment "A," by rotation of the shaft 25 at a speed of about 95 R. P. M. The fluidized zinc oxide flowed through the passageway 23 in the first partition 22 and passed into the second compartment, identified as "B," wherein it was preliminarily heated and humidified with live steam. The fluidized zinc oxide from compartment "B" flowed through the passageway 23 in the second parition and passed into the third compartment, identified as "C," wherein it was finally brought up to the desired temperature and humidification by further exposure to live steam. In each of compartments "B" and "C" the steam was introduced through a steam line 28 and was discharged through a valved outlet 29 both positioned in the cover 21 of the vessel. The heated and humidified zinc oxide maintained in fluidized condition in compartment "C" flowed through the passageway 23 in the next partition and thus passed into compartment "D." Propionic acid vapor was introduced into compartment "D" through a charging line 32 and was vented through a valved outlet line 33 positioned in the cover portion of the vessel. The treated zinc oxide then flowed through the passageway 23 in the next partition and into the last compartment "E" wherein it was cooled and dried by forced air circulation introduced through and removed from air lines 30 and 31 communicating through the cover 21 of the vessel. The cooled and dried propionic acid-treated zinc oxide was discharged over an adjustable weir 34 located in the discharge end of the vessel 20. The zinc oxide passed through the vessel in a fluidized form and behaved like a liquid in its passage therethrough. This operation has been found to be preeminently satisfactory for the surface treatment of zinc particles with propionic acid in accordance with the process described in the United States patent to H. M. Cyr, No. 2,303,329. In the above-described propionic acid treatment of zinc oxide using the contacting method of my invention, the capacity of the mixer per cubic foot of mixer volume was about ten times the capacity of a mixer having the same shape and size but provided with a conventional double spiral ribbon agitator operated at its normal speed. This tenfold increase in capacity appears to be the exclusive result of the mechanically fluidized condition of the particles of zinc oxide during their contact first with steam and then with propionic acid vapor pursuant to the contacting method of my invention.

In addition to the specific operations described in the foregoing examples, the method of my invention is applicable to a wide range of other solid-gas contacting operations. For example, the method may be used in roasting zinc sulfide concentrate with air, the air being supplied as the gas in which the sulfide is fluidized. The method is also useful for effecting contact between finely divided anthracite and a mixture of air and steam for the production of producer gas. Calcination of various carbonates and defluorination of phosphate rock may also be effected by the method of the invention wherein the carbonate or phosphate-bearing solid is brought into contact with the flame and products of combustion of a gas burner or the like. In short, the method is applicable to any solid-gas contacting operation in which the solid does not become plastic or unduly sticky under the conditions prevailing in the operation in accordance with the invention.

Inasmuch as the intimacy of mixture and the uniformity of heating are exceptionally high in the method of my invention, solid-gas contacting operations can be carried out very close to the theoretical temperatures required. Thus, calcination and defluorinating treatments can be carried out at temperatures generally of the order of several hundred degrees centigrade lower than the local elevated temperatures which must be tolerated in producing the same heating effect in a conventional rotary kiln or the like. Accordingly, the actual temperature condition prevailing in the practice of my method, rather than prior art treating temperatures, must be taken into account in considering the applicability of the method to high temperature contacting treatments where agglomeration of the solid particles tends to be prevalent. The fluidization of the particles of solid in the gaseous atmosphere also helps to prevent their agglomeration at temperatures at which the particles would normally tend to agglomerate if they were closely packed together in a dense bed. The maintenance of the solid particles in the form of a mechanically fluidized mass pursuant to my invention has been found to cause surprisingly little abrasion, much less in fact than when the solid particles are agitated to an extent insufficient to effect their fluidization.

I claim:

1. The method of effecting contact between a solid and a gas which comprises introducing the solid in the form of discrete particles into one end of a substantially horizontally disposed elongated vessel having an axially mounted rotatable shaft provided with paddle blades, introducing the gas into the vessel, rotating the paddle-bearing shaft at high speed so as to cause the paddle blades to strike and agitate the particles of solid in the gaseous atmosphere within the vessel to such an extent that the mass of solid particles is expanded in said gaseous atmosphere and thereby forms a fluidized bed having an observable upper free boundary zone, discharging the fluidized mass of solid particles from said bed thereof within the vessel adjacent the opposite end thereof, controlling the rate of discharge of the fluidized mass from said opposite end of the vessel so as to maintain a substantial depth of the fluidized mass of solid particles within the vessel, and permitting passage of the particles of solid through the vessel by fluid flow characteristic of a body of liquid.

2. The method of effecting contact between a solid and a gas which comprises introducing the solid in the form of discrete particles into one end of a substantially horizontally disposed elongated vessel having an axially mounted rotatable shaft provided with paddle blades, introducing the gas into the vessel, rotating the paddle-bearing shaft at high speed so as to cause the paddle blades to strike and agitate the particles of solid in the gaseous atmosphere within the vessel to such an extent that the mass of solid particles is expanded in said gaseous atmosphere and thereby forms a fluidized bed having an observable upper free boundary zone, discharging the fluidized mass of solid particles from said bed thereof within the vessel adjacent the opposite end thereof, controlling the rate of discharge of the fluidized mass from said opposite end of the vessel so as to maintain a substantial depth of the fluidized mass of solid particles within the vessel, and permitting passage of the particles of solid through the vessel by fluid flow characteristic of a body of liquid, the gas being passed through the fluidized mass in countercurrent flow thereto.

3. The method of effecting contact between a solid and a gas which comprises introducing the solid in the form of discrete particles into one end of a substantially horizontally disposed elongated vessel having an axially mounted rotatable shaft provided with paddle blades, introducing the gas into the vessel, rotating the paddle-bearing shaft at high speed so as to cause the paddle blades to strike and agitate the particles of solid in the gaseous atmosphere within the vessel to such an extent that the mass of solid particles is expanded in said gaseous atmosphere and thereby forms a fluidized bed having an observable upper free boundary zone, discharging the fluidized mass of solid particles from said bed thereof within the vessel adjacent the opposite end thereof, controlling the rate of discharge of the fluidized mass from said opposite end of the vessel so as to maintain a substantial depth of the fluidized mass of solid particles within the vessel, permitting passage of the particles of solid through the vessel by fluid flow characteristic of a body of liquid, and controlling the temperature of the fluidized mass by maintaining a temperature-controlling medium in contact with the exterior surface of the vessel.

ERWIN C. HANDWERK.

REFERENCES CITED

The following references are of record in the file of this patent:

UNITED STATES PATENTS

| Number | Name | Date |
|---|---|---|
| 426,361 | Buttner | Apr. 22, 1890 |
| 676,165 | Wacker | June 11, 1901 |
| 702,127 | Churchill | June 10, 1902 |
| 706,965 | Lawrence | Aug. 12, 1902 |
| 1,190,127 | Disdier | July 4, 1916 |
| 1,735,396 | Hiller | Nov. 12, 1929 |
| 1,858,796 | Wilcoxson | May 17, 1932 |
| 1,906,735 | Boynton et al. | May 2, 1933 |
| 2,008,270 | Willekens | July 16, 1935 |
| 2,026,922 | Vincent | Jan. 7, 1936 |
| 2,035,716 | Peek | Mar. 31, 1936 |
| 2,220,193 | Ahlmann | Nov. 5, 1940 |
| 2,364,274 | Crawford | Dec. 5, 1944 |
| 2,404,944 | Brassert | July 30, 1946 |